April 15, 1969  J. W. KLOSS  3,438,251
OPTICAL TRANSDUCER
Filed July 26, 1965  Sheet 1 of 11
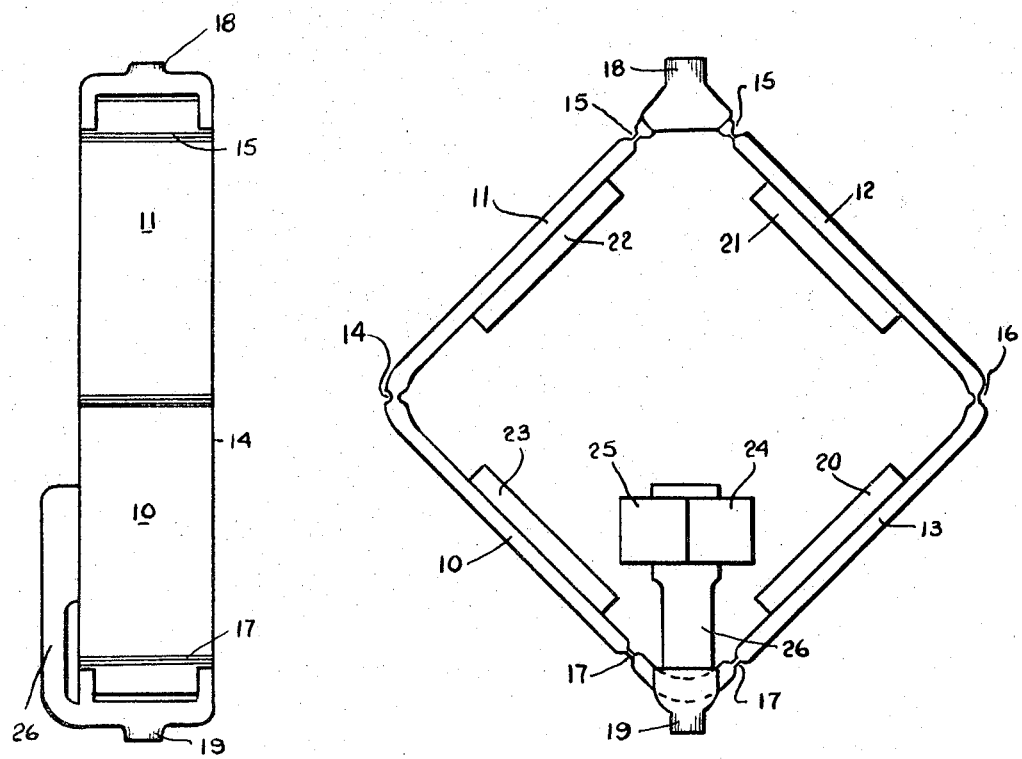
Fig. 1A.   Fig. 1.
Fig. 1B.
INVENTOR.
JOHN W. KLOSS
BY
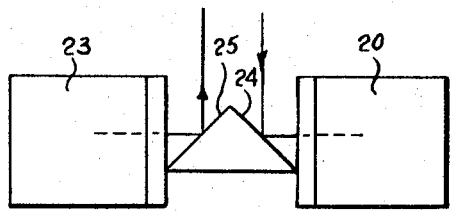
ATTORNEY.

INVENTOR.
JOHN W. KLOSS
BY
ATTORNEY.

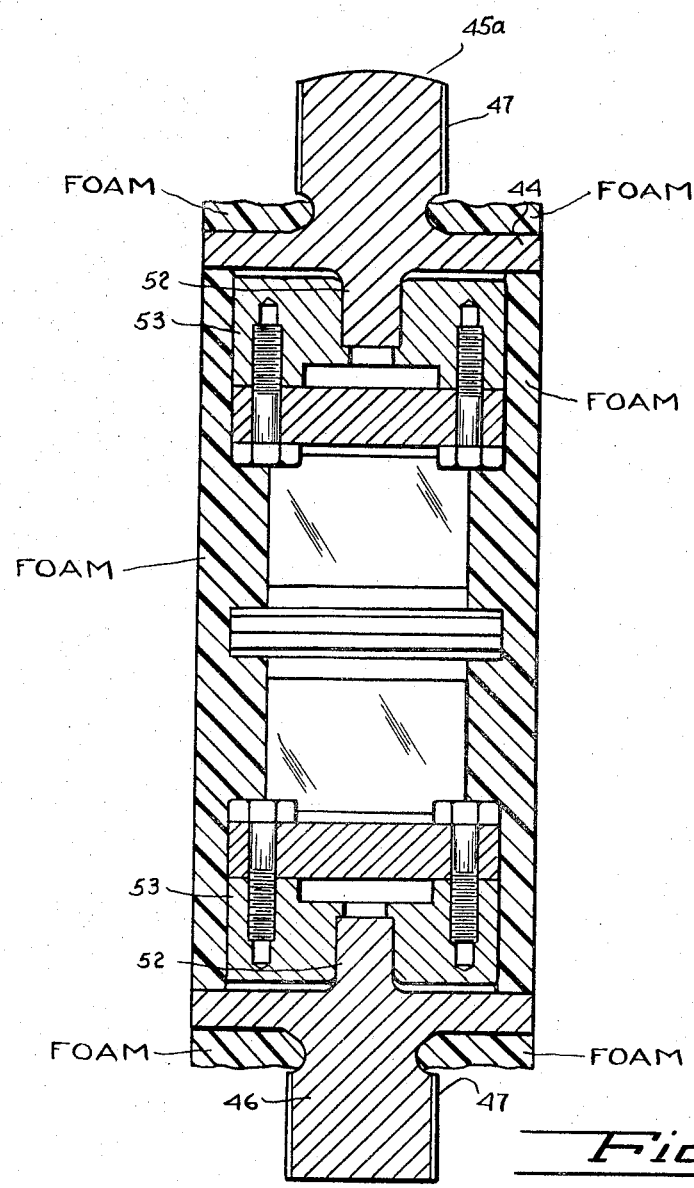

INVENTOR.
JOHN W. KLOSS

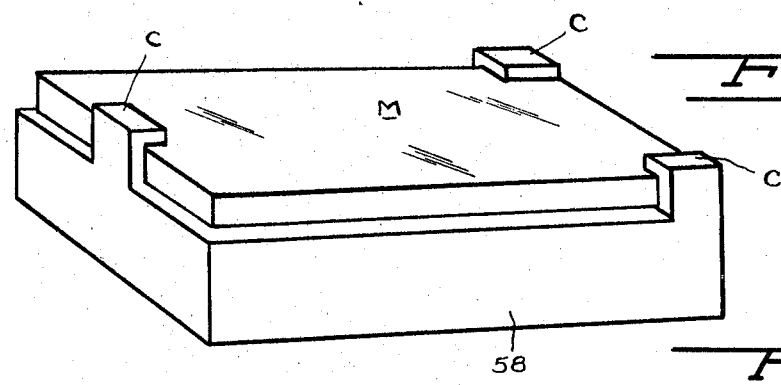
Fig. 11.
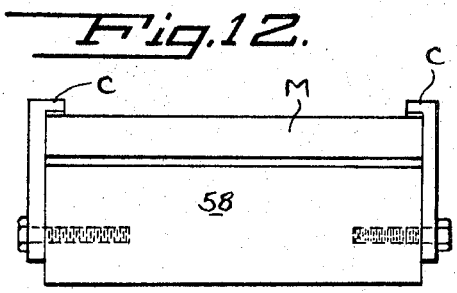
Fig. 12.
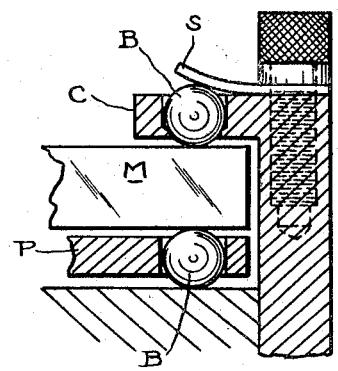
Fig. 13.
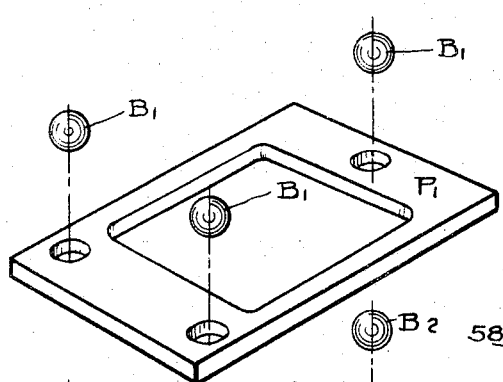
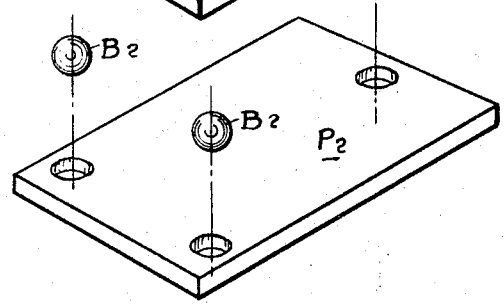
Fig. 14.
Fig. 15.
INVENTOR.
JOHN W. KLOSS

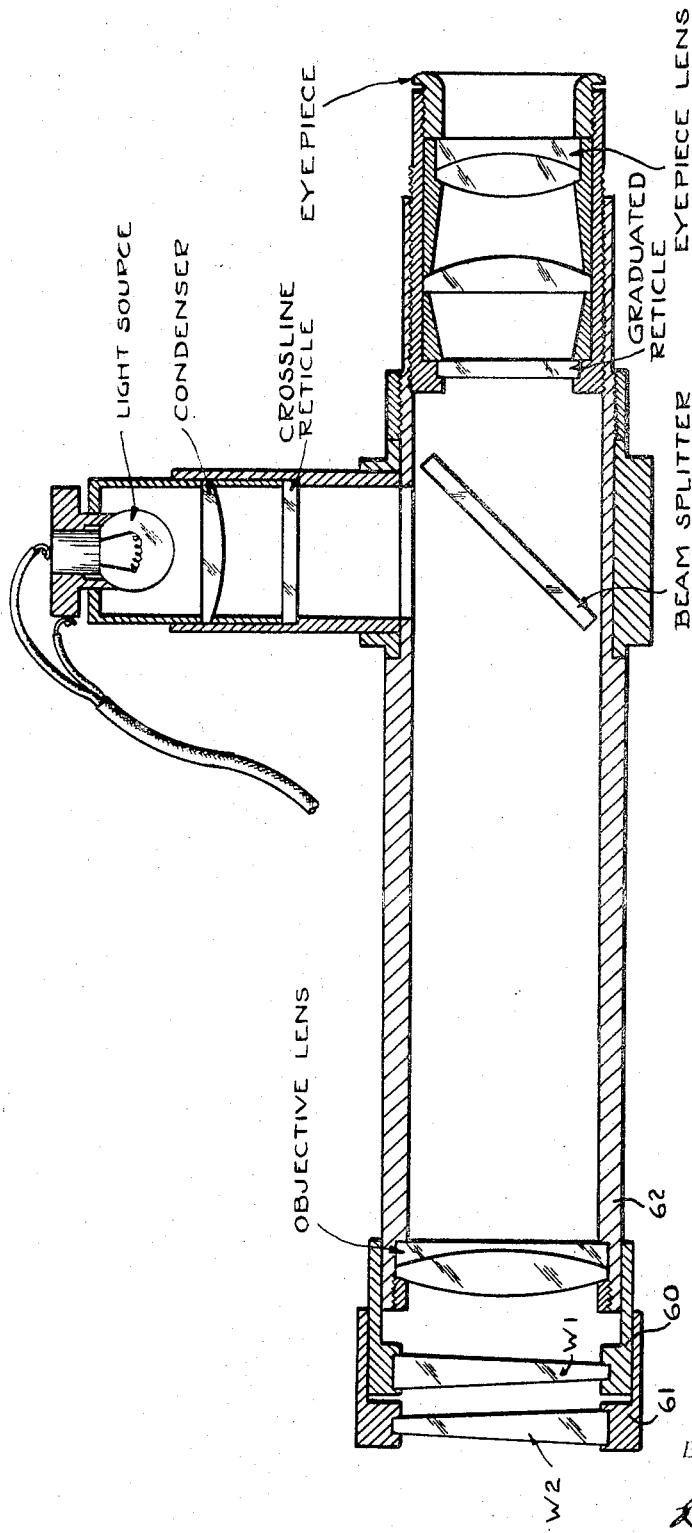

United States Patent Office 3,438,251
Patented Apr. 15, 1969

3,438,251
OPTICAL TRANSDUCER
John W. Kloss, Erie, Pa., assignor to Lord Corporation, Erie, Pa., a corporation of Pennsylvania
Filed July 26, 1965, Ser. No. 474,845
Int. Cl. G01l 5/00
U.S. Cl. 73—141                             16 Claims

ABSTRACT OF THE DISCLOSURE

A transducer which can be used either to measure displacement or to measure force, the former if the transducer resists motion with a negligible force, and the latter if the transducer produces a significant resisting force. Readout is by optics, for example by a beam of collimated light from an autocollimator entering the transducer, traversing a prescribed path within the transducer, and being returned to the autocollimator for sensing. As a force transducer, it may be made in combination with external or internal springs to provide greater resisting force than can be generated by full-scale deflection of the motion transducer alone. "Full-scale" is determined by the maximum angle the accessory autocollimator can accommodate, or alternately, by the maximum nonlinearity permitted between the true motion or force input and the displayed reading. In a preferred form, the transducer is in the form of a hollow square with rigid sides hinged at the corners and reflecting means on the sides are optically aligned to transmit an incident beam successively to adjacent reflecting means.

---

This invention relates to force-optical transducers (proving rings) and to motion-optical transducers and has particular reference to a new and improved transducer of the type set forth wherein optical means are employed for converting the change in diameter of a proving ring or of the transducer alone into a corresponding change in the angle of a beam of light, which is sensed and interpreted with the aid of optical means such as an autocollimator.

An object of the invention is to provide a new and improved arrangement for making the proving ring, which is usually limited to measuremnt of static forces, capable of dynamic response with no sacrifice in sensitivity or accuracy. The dynamic response is achieved by using stroboscopic illumination with the transducer and autocollimator.

Another object is to provide a new and improved arrangement whereby a proving ring and its enclosed transducer component can be made all out of a single piece of metal, thereby achieving minimum hysteresis and inherent temperature compensation, and which has no moving parts such as screws running in nuts and in which any relative motion of the parts is confined to bending and by selective placement of stresses and strains, to those parts where bending is desired.

Another object is to provide a new and improved device of the type set forth wherein the order of magnitude of ring stiffness is greatly increased as compared with prior type proving rings and which, therefore, because of its optical transduction means, is capable of simultaneous dynamic and static application extending to fairly high frequencies, and which therefore is capable of use in many applications such as a proving ring for static and dynamic calibration of fatigue machines; as a proving ring for static calibration of testing machines; as a proving ring for static and dynamic calibration of hydraulic servo-operated dynamic testing machines; as a transducer in general for fatigue and dynamic testing machines since it is capable of static and dynamic motion response simultaneously.

In this connection it is pointed out that the proposed ring can be more than ten times as stiff as conventional proving rings because of the great sensitivity of the enclosed motion-optical transducer compared with prior devices, especially the direct micrometer reading of ring diameter.

Another object is to provide a new and improved device of the type set forth wherein the readout device which may be an autocollimator may be placed at a great distance from the proving ring or transducer and which requires no interconnection save that of optics, which might be required in nuclear environments or for reasons of temperature, or in those uses where a proving ring must be used but where the requirements of complete lack of outside influence such as operator manual contact or his own thermal radiation must be eliminated.

Referring to the drawings:

FIG. 1 is a front schematic view of one form of the motion-optical transducer constructed according to the invention;

FIG. 1A shows an end view of the form of the invention shown in FIG. 1;

FIG. 1B shows a bottom view of the optics of FIGS. 1 and 1A, with all structural parts having been removed for clarity;

FIG. 7 is a sectional view of FIG. 6, taken along line 7—7 of FIG. 6, looking in the direction of the arrows, and with the addition of a protective layer of foam.

FIGS. 11 through 15 are views illustrating details of one form of reflector holder which may be embodied in the invention; and FIG. 16 is a diagrammatic view of an autocollimator for employment with the invention.

Figures 2, 2A:
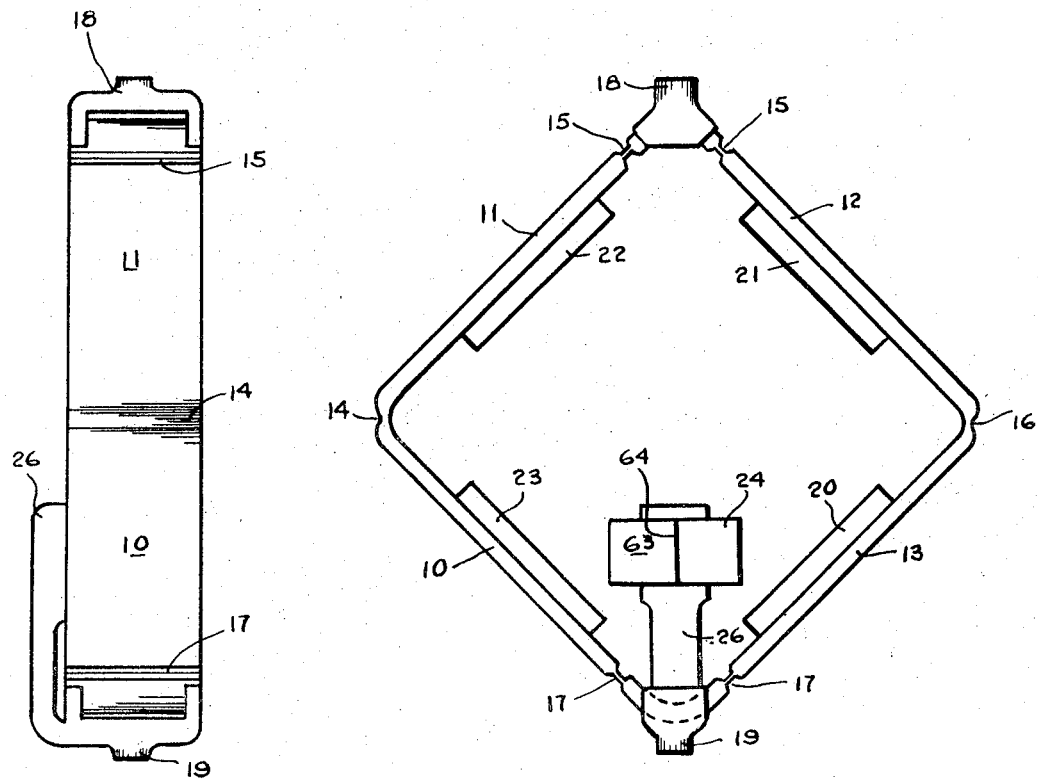
FIG. 2 is a front schematic view of another form of the invention.
FIG. 2A shows an end view of the form of the invention shown in FIG. 2.
Figure 2B:
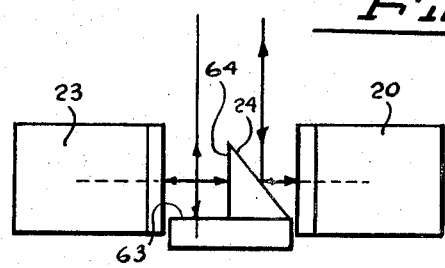
FIG. 2B shows a bottom view of the optics of FIGS. 2 and 2A, with all structural parts having been removed for clarity.

Referring more particularly to the drawings wherein similar reference characters designate corresponding parts throughout, the device shown embodying the invention in FIGS. 1, 1A, and 1B, shows a motion transducer consisting of a hollow square or parallelogram having the four sides 10, 11, 12, and 13 with the adjacent sides connected by the flexures or hinged corners 14, 15, 16, and 17 which are preferably flexure joints to eliminate backlash although suitable forms of hinged connections might be employed.

The transducer is provided with upper and lower diametrically opposed end surfaces 18 and 19 for connection to objects or surfaces whose relative motion is to be monitored by motion-to-optical transducer action.

The input to the transducer is linear translation applied to the end surfaces 18 and 19. To the extent that the transducer has stiffness, it can resist deflection with force. It may therefore be used alone as a force measurement device or "proving ring."

As proving ring it is limited to small forces when used alone. Extending its usefulness to high forces is accomplished by placing the motion-optical transducer within and operatively connected to a load carrying member, thus forming a proving ring assembly.

Figure 3:
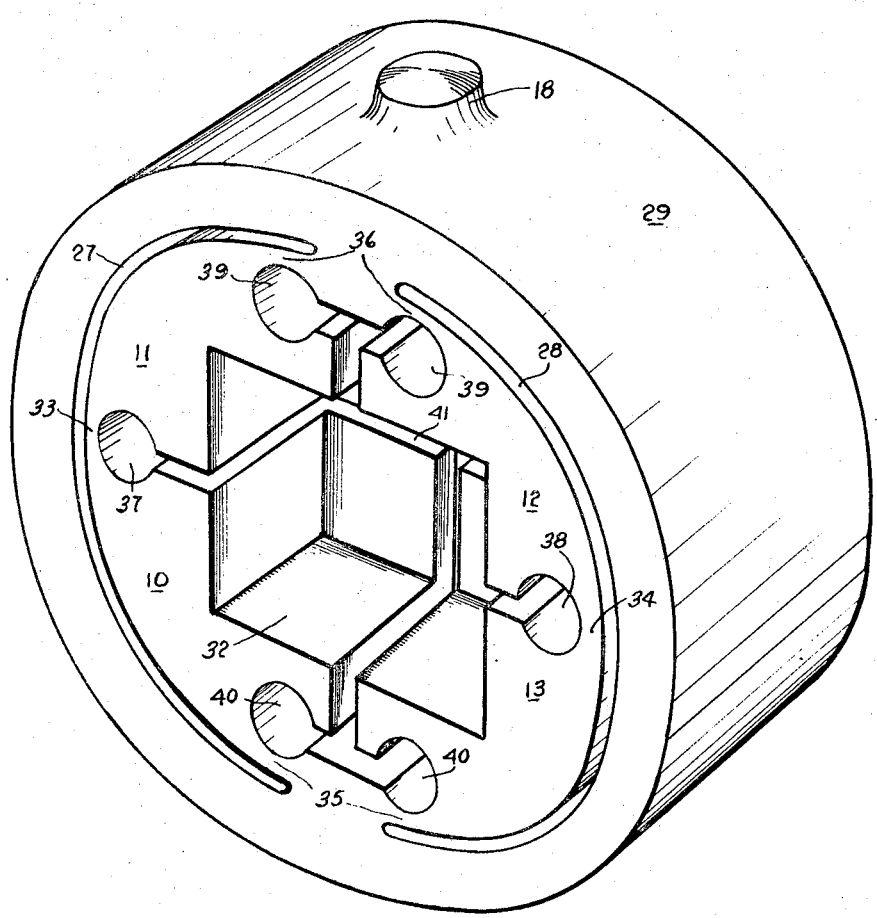
FIG. 3 is a perspective view of the structure of another form of the invention.
Figure 4A:
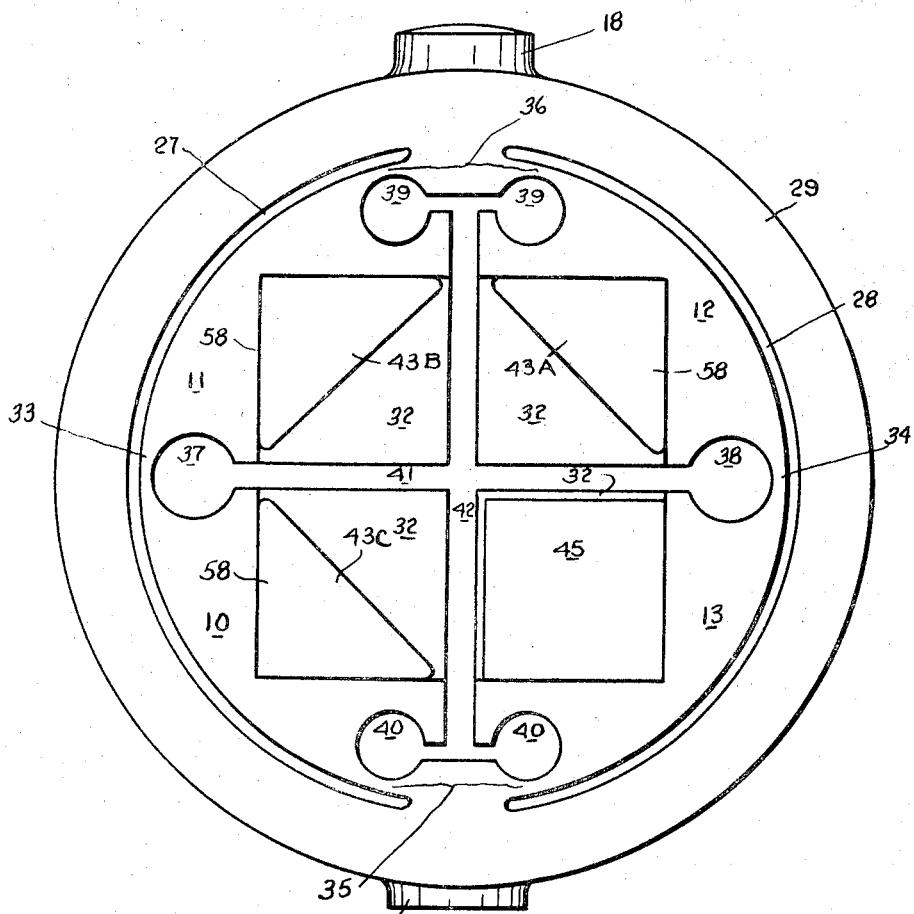
FIG. 4A is a perspective view of a prism retainer for the prism in FIG. 4.
Figure 4:
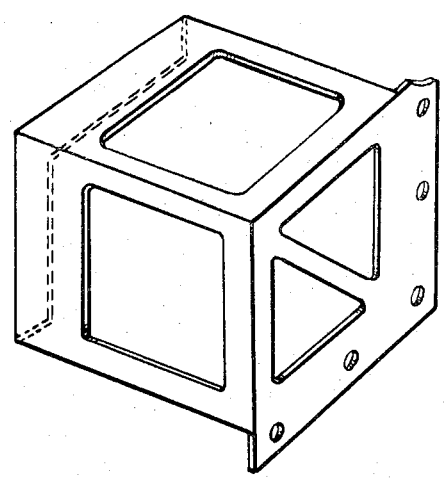
FIG. 4 is a front view of the form of the invention shown in FIG. 3, including structure and optics.
Figure 5:
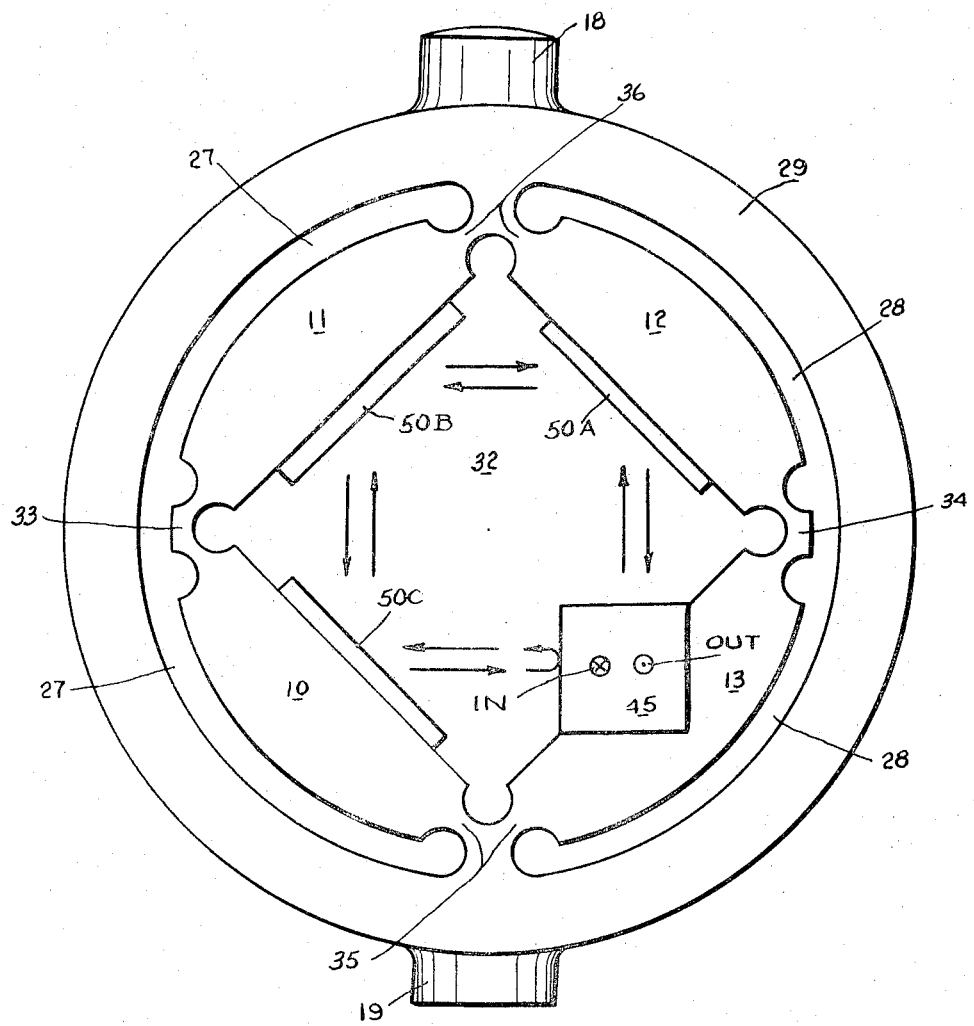
FIGS. 5 and 6 are views generally similar to FIG. 4, but showing additional forms of the invention.
Figure 6:
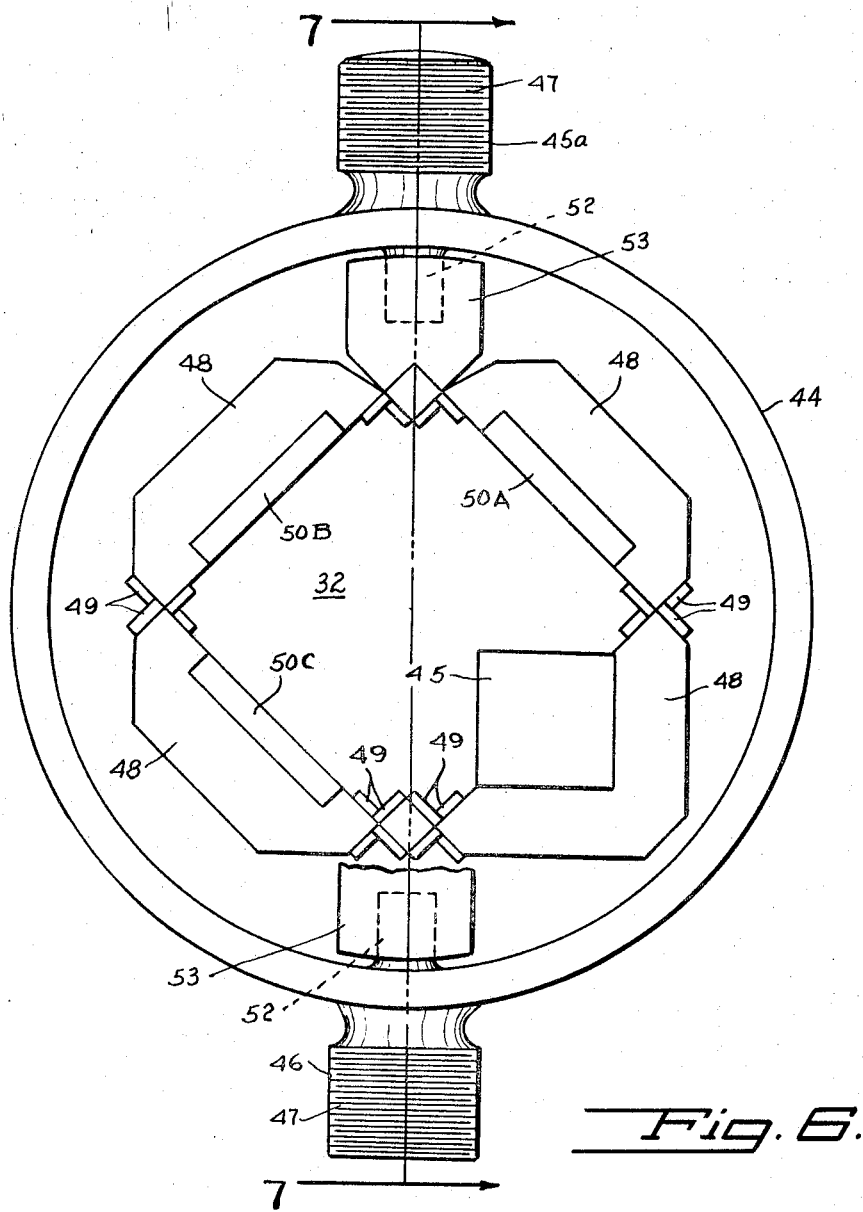

FIGURES 3 and 4 show a form of the invention in which this has been done, as do FIGS. 5, 6, and 7.

The input to the proving ring assembly is force, applied to the end bosses 18 and 19, the force causing corresponding deflection of the load carrying member and of the transducer and hence creating a corresponding indication in the accessory autocollimator.

There are three variations of the basic optical arrangement disclosed. They are shown in FIGS. 1, 2, and 4, and are hereinafter denoted Types I, II, and III.

In the form of the motion-optical transducer shown in FIG. 1, each of the four sides 10, 11, 12, and 13 has a reflector, preferably a front surface mirror, 20, 21, 22, and 23 secured thereto with reflector 20 optically aligned with reflector 21 which is optically aligned with reflector 22 which is optically aligned with reflector 23.

A stationary pair of reflectors 24 and 25 is provided to direct a collimated beam of light from outside the transducer onto the first mirror 20, by which it is reflected to the second mirror 21, by which it is reflected to the third mirror 22, by which it is reflected to the fourth mirror 23 which in turn reflects said light beam onto reflector 25 and back into the autocollimator. The reflector-mirror system is symmetrical; light from the autocollimator strikes both reflectors 24 and 25 equally and half goes around the mirror system one way, the other half the other way. The effect is the same either way.

The stationary reflectors 24 and 25 are mounted on bracket 26.

A change in the vertical diagonal dimension of the transducer causes an opposite change in the horizontal diagonal, producing a rotation of each of the four sides 10, 11, 12, and 13, and thereby of the four mirrors 20, 21, 22, and 23.

The total angular difference between the incoming rays and the outgoing rays is $8\theta$ where $\theta$ equals the angular rotation of each of the four mirrors.

In a second form of the invention, an optical system as shown in FIG. 2 is employed. This is Type II. In this form each of the four sides 10, 11, 12, and 13 are separated by flexures 14, 15, 16, and 17, have attached thereto reflectors 20, 21, 22, and 23. Mounted in stationary form on bracket 26 are reflectors 24 and 63 and 64. Light from an autocollimator is directed by reflector 24 onto the first mirror 20, by which it is reflected onto the second mirror 21, by which it is reflected onto the third mirror 22, by which it is reflected onto the fourth mirror 23, by which it is reflected onto the stationary reflector 64, which returns it to reflectors 23, 22, 21, and 20, and then to reflector 24, which directs it back into the autocollimator.

A change in the vertical diagonal dimension of the transducer causes an opposite change in the horizontal diagonal, producing rotation of the mirrors 20, 21, 22, and 23.

The total angular difference between incoming and outgoing rays is $16\theta$ where $\theta$ is the rotation of any one mirror.

Reflector 63 has been added to provide a stationary reference direction.

In the third form of the invention, an optical system as shown in FIG. 4 is employed. This is Type III. In this form, three of the four sides, 10, 11, and 12, respectively have attached thereto reflectors 43A, 43B, 43C. The fourth side 13 has attached thereto a prism 45. The four sides 10, 11, 12, and 13 are separated by flexures 33, 34, 35, and 36. An autocollimator projects a beam of collimated light from outside the transducer into prism 45, the 45-degree internally silvered face of which reflects the beam upwards onto mirror 43A, which reflects it onto mirror 43B, which reflects it onto mirror 43C, which reflects it onto the outside silvered face of prism 45, which returns the beam to reflector 43C, thence to 43B and 43A, and down into prism 45, wherein the 45-degree internal face directs the beam out and returns it to the autocollimator. The first surface (front surface) of prism 45 is half-silvered and provides a reference direction. The half-silvering may be dichroic in nature, automatically color-coding the reference and the measurement rays differently.

The total angular difference between incoming and outgoing rays is $16\theta$ where $\theta$ is the rotation of any one mirror or of the prism.

FIG. 6 shows a form of the invention embodying an optical system of Type III but not having unitary construction. The transducer is constructed of four rigid portions 48 separated by flextures 49 and mounted by means of adapters 53 on bosses 52 within a common form of load-carrying member 44, having end surfaces adapted for compression loading and threaded portions 45a and 46 carrying threads 47 which adapt the load-carrying member for tension loads.

FIG. 5 shows a form of the invention made according to Type III, in which the functions of the parts are exactly the same as in FIG. 4 but in which the shapes of the arcuate slots are changed, and the shapes of the sides of the recess 32 are changed to adapt the interior of the recess to the attachment of plane-parallel front surface reflectors.

FIG. 7 is a sectional view of FIG. 6, taken along line 7—7 of FIG. 6, looking in the direction of the arrows. As will be seen from FIG. 7, the interior and exterior of the proving ring assembly and its enclosed transducer can be protected with a low-modulus plastic foam which provides a thermal barrier. An aperture is left at the front face of prism 45 to permit optical access to the transducer. A sheet of thin plastic film may be first adhered to the outer surfaces of the transducer to prevent the foam filling the cavity or recess 32, before the foam is applied.

In FIGS. 13 through 15 are shown several methods of mounting a mirror between two sets of three round balls. The mounting is at three points to prevent warping of the mirror. The mirrors must also be restrained from moving in any direction at right angles to a normal to the mirror, or from moving a rotation about the normal.

FIG. 16 shows a typical autocollimator which might be used with any of the transducers or proving ring assemblies shown, and which has incorporated a pair of optical wedges, rotation of which allows alignment of the optical systems of the transducer and autocollimator without actually altering the mechanical axes of the two pieces. The wedges are independently adjustable and have equal angles. They can add to twice the deviation of a single wedge, or subtract to zero.

Basically, all of the transducers disclosed consist of a hollow square having rigid sides and flexible corners. The input to the transducer is translation applied at a pair of opposite corners of the transducer. The optical system is located inside the square.

Two variations of the optical system are disclosed. In one form, four mirrors are mounted, one on each side of the square, and a stationary pair of reflectors is provided to direct a collimated beam of light from outside the transducer onto the first of the four mirrors, thence to the second, third, and fourth mirrors, thence onto the second stationary reflector and back into the autocollimator. (The reflector-mirror system is symmetrical; light from the autocollimator strikes both of the stationary mirrors equally, half goes around the mirror system one way and the other half the other direction; the effect is the same either way.)

The second optical system is characterized by the fact that the bundle of rays, rather than being returned to the autocollimator by the second stationary reflector, is sent back through the mirror system again, but in the opposite direction, being returned to the autocollimator by the first reflector. Two variants of this second system are disclosed: they are previously referred to as Type II and Type III.

Figure 10:
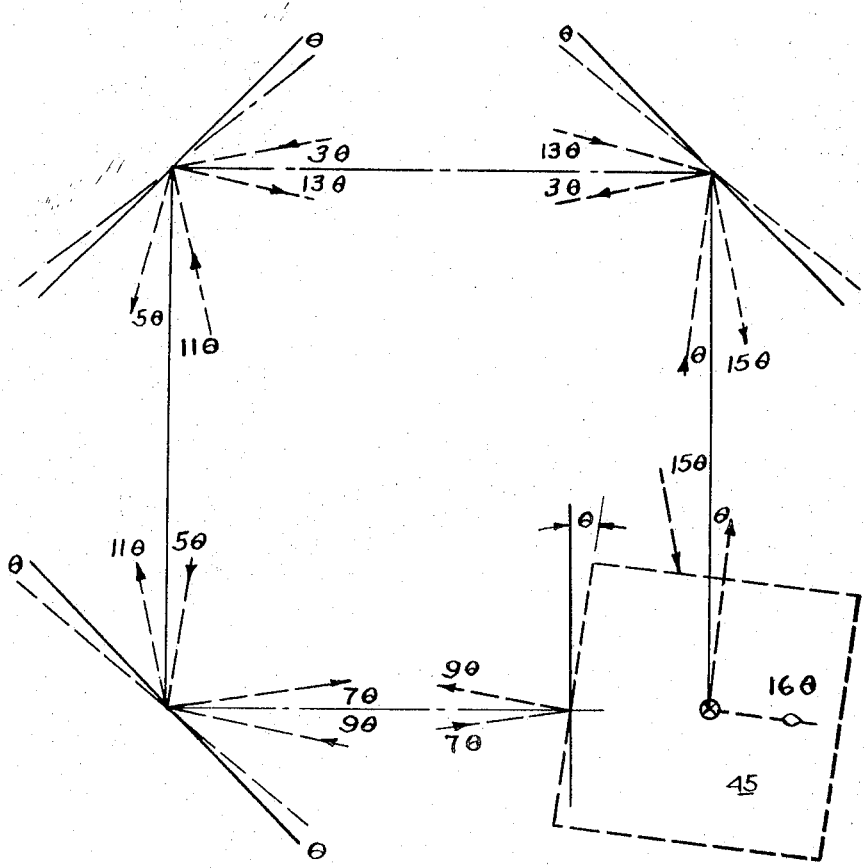
FIGS. 9 and 10 are diagrammatic views illustrating the operation of the optical system employed in the preferred form of the invention.
Figure 8:
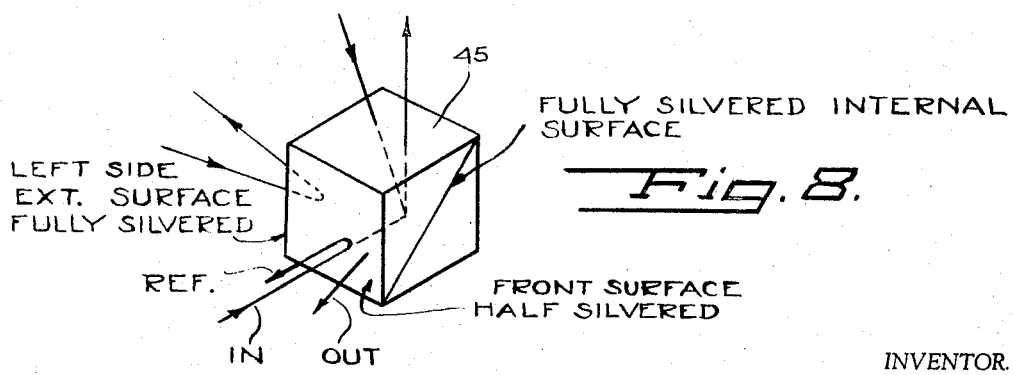
FIG. 8 is a perspective view of the prism embodied in the form of the invention shown in FIGS. 4, 5, and 6.
Figure 9:
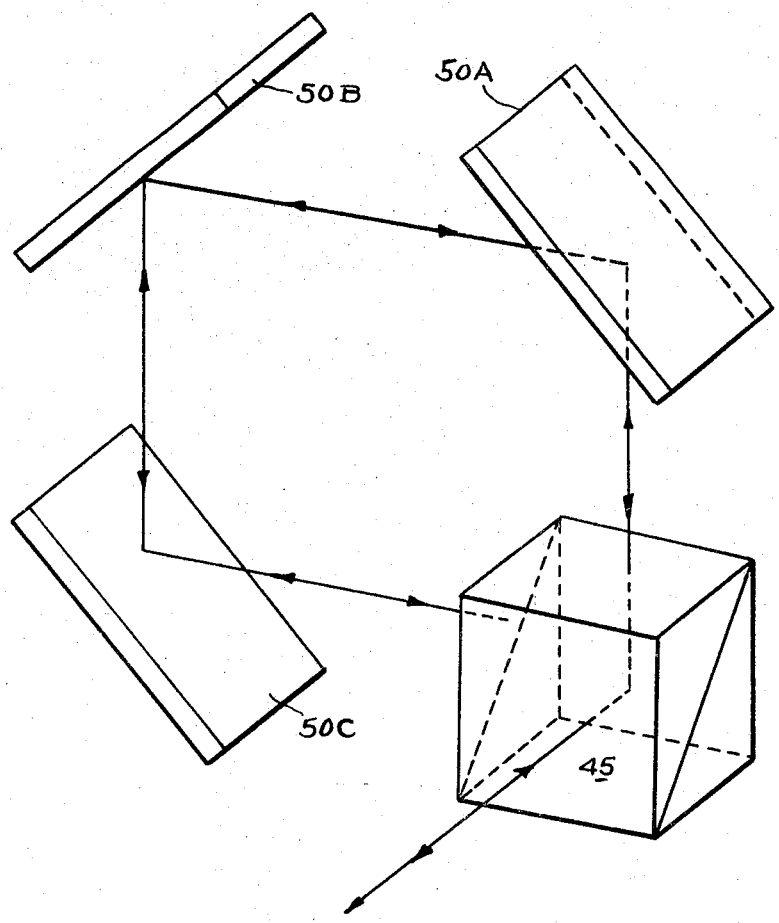

FIG. 1 shows the optical system of the first type, installed in a schematic transducer. FIG. 10 shows the optics only of the second variant of the second type: Type III, which uses a prism mounted on one of the sides of the hollow square rather than using stationary reflectors.

As the square is subjected to translation across a diagonal, the square departs from its original shape and becomes a parallelogram. Each mirror undergoes an angular motion $$\theta = \sqrt{\frac{2d}{2L}}$$

radians, where $d$ is the input translation in inches or millimeters and $L$ is the length of a side of the square in the same units, measured from corner hinge to corner hinge. It is assumed that the angle is small, and that the simplification sine $\theta = \theta$ holds. ($\theta$ will typically be in minutes of angle.)

The purpose behind using the multiplicity of mirrors is to obtain optical magnification of the angle developed. One circuit of the mirrors, as in Type I, gives an optical output four times that which would be observed if the autocollimator viewed only one mirror. Two circuits, as in Types II and III, double the output to eight times that obtained from a single mirror.

An autocollimator is designed to sense and indicate the tilt of a single mirror. To that end, it is usually calibrated to read directly the angle $\theta$ even though it senses $2\theta$. The increase in sensitivity over a single mirror is given by dividing the transducer output by $2\theta$, however, not by $1\theta$.

In use, the transducers disclosed would be calibrated in terms of force or displacement vs. autocollimator indication in minutes or seconds or angle or in some angular unit. Appropriate selection of $d$ and $L$ would make possible 1:1 correspondence between common angular units and the units of the input. Conversely, specially calibrated autocollimators can be employed.

FIG. 10 is a schematic drawing of a Type III optical system, in which the original positions of the three mirrors are shown by heavy lines and the deflected position by dotted lines. Each mirror, and the prism, are rotated through angle $\theta$. The arrows depict in exaggerated form the gradual increase in optical leverage, becoming a deviation of $16\theta$ at the output. Types I and II operate in the same manner, differing in small detail only.

Practical sensitivity of the transducer is obtained by assigning values to $d$ and $L$, and assuming a magnitude for the optical output. A typical commercially available autocollimator has a full scale range of 10 minutes. The input translation required to obtain full scale indication in the autocollimator is, for a transducer having a diagonal of four inches, for a Type I system, 0.0015 inch, and for Types II and III, 0.00075 inch.

These figures compare, for example, with the deflection required of the diameter of a present-day commercially available circular proving ring (one postulated application for the transducer): a modern proving ring must have a diametrical change of 0.040 inch minimum at full scale.

The distance between an autocollimator and the mirror system is immaterial; it does not enter the problem. A good autocollimator of two-inch diameter objective lens will work to distances of 100 feet. The transducers disclosed would require as large size optical elements as is consonant with compactness.

A reference direction must be provided to make the transducer usable in practice. The "signal" is the difference between the initial direction of the output ray and the final direction, assuming that the plane of the transducer is constant. With the addition of a reference direction image, the final direction of the output ray can be corrected by the amount of shift in the reference ray.

Color coding, while not essential, is a desirable addition. Color coding of Type II could be accomplished by simple filtering. Type III can be coded by using a dichroic coating as the partially reflecting coating on the first surface of the prism 45.

The operation of the invention is believed apparent from the foregoing description taken with the accompanying drawings.

From the foregoing it will be seen that I have provided new and improved means for obtaining all of the objects and advantages of the invention.

I claim:

1. A transducer comprising, a hollow member having a plurality of relatively rigid inner surfaces connected by relatively flexible connecting portions, said surfaces each being adapted to support a reflector with each of said reflectors being optically aligned with adjacent reflectors, one of said reflectors being adapted to receive a collimated beam of light and reproject said beam.

2. A transducer to convert linear motion to angular deflection of light comprising, a hollow square having rigid sides and hinged corners, a mirror mounted on each of three sides of said square and a prism mounted on the fourth side thereof, whereby upon change in diagonal dimension of said square, light from an autocollimator having been transmitted to said prism is reflected in turn by said mirrors successively to said prism and then by said prism back to the adjacent mirror and then back by the mirrors successively to the prism from which it is reflected to the autocollimator.

3. A transducer to convert linear motion to angular deflection of light, consisting of a parallelogram member having rigid sides and hinged corners, a mirror on three of said sides and a prism on the fourth side, whereby upon change of diagonal dimensions of said parallelogram light entering the prism from external optical means is reflected from said prism to the adjacent mirror by which it is reflected to the next mirror and then to the third mirror by which it is reflected to the prism which returns such light to the third mirror which returns it to the second which returns it to the first which returns it to the prism which returns it to said external optical means.

4. A transducer to convert linear motion to angular deflection of light, consisting of four reflectors, one on each of four rigid sides of a parallelogram having flexible corners, whereby upon change of diagonal dimensions of said parallelogram the angle of the reflectors is changed, and said reflectors forming an optical circuit to direct light from one to the next, around the circuit in an approximately square path, stationary reflector means for injecting light into the system and to recover it for return to an accessory autocollimator, said stationary reflector means providing a reference angle for constant comparison with the signal angle.

5. A transducer to convert linear motion to angular deflection of light, consisting of first, second, third and fourth reflectors, one on each of four rigid sides of a parallelogram having flexible corners, whereby upon change of diagonal dimensions of said parallelogram the angle of the reflectors is changed, and said reflectors forming an optical circuit to direct light from the first to the second reflector and then sequentially to the third and fourth reflectors around the circuit in an approximately square path, first and second stationary reflectors, said first stationary reflector injecting light into the system and recovering it for return to an accessory autocollimator, the second stationary reflector reflecting light from the fourth reflector of said circuit back to said fourth reflector, thence to the third reflector, thence to the second reflector, thence to the first reflector, thence to said first stationary reflector, and returned to said accessory autocollimator, and a third stationary reflector positioned to provide a reference angle for constant comparison with the light returned to said accessory autocollimator by said first stationary reflector.

6. A transducer to convert linear motion to angular deflection of light comprising, a hollow square having rigid sides and hinged corners, a mirror mounted on each of three sides of said square and a prism mounted on the fourth side thereof, whereby upon change in diagonal dimension of said square, light from an autocollimator having been transmitted to said prism is reflected in turn by said mirrors successively to said prism and then by said prism back to the adjacent mirror and then back by the mirrors successively to the prism from which it is reflected to the autocollimator and a dichroic color coding partially reflecting coating on said prism.

7. A transducer to convert linear motion to angular deflection of light comprising, a hollow square having rigid sides and hinged corners, a mirror mounted on each of three sides of said square and a prism mounted on the fourth side thereof, whereby upon change in diagonal dimension of said square, light from an autocollimator having been transmitted to said prism is reflected in turn by said mirrors successively to said prism and then by said prism back to the adjacent mirror and then back by the mirrors successively to the prism from which it is reflected to the autocollimator and a dichroic filter on the front face of said prism.

8. A motion transducer consisting of a ring having four sides arranged end to end, the sides being relatively rigid portions, hinge means connecting the ends of adjacent sides whereby the angular relation of the sides may be changed without flexing the sides, motion transmitting means for moving diagonally opposite hinge means toward and away from each other to cause corresponding changes in the angular relation of said sides, reflector means fixed to the respective sides and oriented to transmit a beam of light to one of said reflector means and then successively to adjacent reflector means whereby the angular displacement of the beam indicates the motion transmitted to said diagonally opposite hinge means.

9. The transducer of claim 8 in which the hinge means are flexure portions.

10. The transducer of claim 9 in which the sides and hinge means are in one piece and the hinge means are formed by weakened sections.

11. A force and motion transducer comprising a load carrying member deflected in proportion to the applied load, and the motion transducer of claim 8 having its motion transmitting means connected to said load carrying member.

12. The transducer of claim 11 in which the load carrying member is a ring surrounding the ring of the motion transducer.

13. The transducer of claim 12 in which the ring of the force transducer is connected to the ring of the motion transducer at diametrically opposite points.

14. The transducer of claim 12 in which the force and motion transducers and the connections therebetween are in one piece.

15. The transducer of claim 14 in which the ring of the force transducer surrounds and is spaced from the ring of the motion transducer by arcuate slots.

16. The transducer of claim 8 in which the source of the beam is an autocollimator and the reflector means are oriented to reflect the beam in a closed loop from and back to the autocollimator after the successive reflections.

References Cited

UNITED STATES PATENTS

| | | | |
|---|---|---|---|
| 2,768,525 | 10/1956 | Brownhill et al. | 73—136 |
| 2,978,906 | 4/1961 | Haalck | 73—382 |
| 3,303,694 | 2/1967 | D'Onofrio | 73—141 |

RICHARD C. QUEISSER, *Primary Examiner.*

CHARLES A. RUEHL, *Assistant Examiner.*

U.S. Cl. X.R.

73—88; 88—14